United States Patent
Resendez Rodriguez et al.

(10) Patent No.: US 10,679,048 B2
(45) Date of Patent: Jun. 9, 2020

(54) PRESERVING STYLES AND INK EFFECTS IN INK-TO-TEXT

(71) Applicant: Microsoft Technology Licensing, LLC, Redmond, WA (US)

(72) Inventors: Ana Ruth Resendez Rodriguez, Redmond, WA (US); Abhinav Gupta, Vancouver (CA); Gilles Louis Peron, Issaquah, WA (US); Carine Ramses Iskander, Redmond, WA (US); Justin Leigh Schnarr, Seattle, WA (US); William Joseph Devereux, Redmond, WA (US); Ian Mikutel, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 106 days.

(21) Appl. No.: 15/871,942

(22) Filed: Jan. 15, 2018

(65) Prior Publication Data

US 2019/0087653 A1 Mar. 21, 2019

Related U.S. Application Data

(60) Provisional application No. 62/560,187, filed on Sep. 18, 2017.

(51) Int. Cl.
*G06K 9/00* (2006.01)
*G06T 11/00* (2006.01)

(52) U.S. Cl.
CPC ..... *G06K 9/00416* (2013.01); *G06K 9/00852* (2013.01); *G06T 11/001* (2013.01); *G06K 2209/01* (2013.01)

(58) Field of Classification Search
CPC ............ G06K 9/00416; G06K 9/00852; G06T 11/001
See application file for complete search history.

(56) References Cited

U.S. PATENT DOCUMENTS

| | | | | |
|---|---|---|---|---|
| 2004/0093565 A1* | 5/2004 | Bernstein | .............. | G06F 17/242 715/268 |
| 2010/0306698 A1* | 12/2010 | Sellers | .................. | G06F 17/241 715/805 |

\* cited by examiner

*Primary Examiner* — Ruiping Li
(74) *Attorney, Agent, or Firm* — Talem IP Law, LLP (57) ABSTRACT

Preserving ink effects in ink-to-text are described. A method of preserving styles and ink effects in ink-to-text can include receiving ink strokes, each ink stroke having associated ink parameters; receiving a command to convert one or more ink strokes to text; identifying text comprising characters and words from the one or more ink strokes; generating an appropriate coloring or style for each character or word based on the ink parameters associated with corresponding ink strokes, the appropriate coloring or style being generated based on a mapping between ink parameters and text parameters; and applying the appropriate coloring or style to the text.

17 Claims, 5 Drawing Sheets

Ink to text is awesome
and it respects my style
options.
BUT nothing as fun as drawing with the
rainbow.
Or from a far far away place.

PRESERVING STYLES AND INK EFFECTS IN INK-TO-TEXT

CROSS-REFERENCE TO RELATED APPLICATION

This application claims the benefit of U.S. Provisional Patent Application Ser. No. 62/560,187, filed Sep. 18, 2017.

BACKGROUND

Digital ink strokes are markings that are represented by a set of properties and point data that a digitizer captures. It can be the set of data that is captured in a single pen down, up, or move sequence. The act of generating the digital ink strokes can be referred to as "inking" and may be accomplished via input mechanisms of a stylus or pen (or even user finger on a touch screen or pad) that capture handwriting in its natural form.

Content creation applications are software applications in which users can contribute and/or modify content. The content can be visual content where users can create text and/or image-based content in digital form. Content creation applications such as notebook applications, whiteboard applications, word processing applications, spreadsheet applications, and presentation applications are useful tools for generating and curating content. These and other content creation applications are increasingly including "inking" functionality that lets users input content and interact with the application (and content created therein) through using a pen or stylus (and sometimes fingers or other objects) in a manner evoking a pen on paper.

BRIEF SUMMARY

Systems and methods preserving styles and ink effects in ink-to-text are provided. When converting ink to text, an ink conversion feature not only identifies characters and words, but also applies styles to the text based on the ink parameters. The ink conversion feature can indicate a font (e.g., cursive or block lettering), a font size (e.g., based on height of the inked letter), a font style (e.g., underline, italics, bold, regular), a font effect (e.g., strikethrough, superscript, subscript, capital letters), a color of the background, and a color or ink effect (e.g., red, blue, rainbow, galaxy) of the ink stroke.

An application with inking functionality can receive ink strokes, with ink coloring and ink effects applied as desired by a user. When an ink effect is applied to an ink stroke, the ink effect definition may be assigned to the ink stroke as part of the ink stroke's properties. As with other ink-to-text functionality, when a command to convert ink strokes is received, an ink analysis can be performed to obtain text corresponding to groupings of ink strokes. Instead of simply applying a default font, font size, and font style, an appropriate coloring or style can be applied to the text based on the parameters of the ink strokes including the ink effect definition assigned to the ink stroke from which the text was converted. For certain ink effects, colors can be applied character-by-character.

A method of preserving styles and ink effects in ink-to-text can include receiving ink strokes, each ink stroke comprising ink parameters such as pressure, ink color, and ink effect. In response to receiving a command to convert one or more ink strokes to text, the method can further include identifying text comprising characters and words from the one or more ink strokes; generating an appropriate coloring or style for each character or word based on the ink parameters associated with corresponding ink strokes, the appropriate coloring or style being generated based on a mapping between ink parameters and text parameters; and applying the appropriate coloring or style to the text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and methods preserving styles and ink effects in ink-to-text are provided. When converting ink to text, an ink conversion feature not only identifies characters and words, but also applies styles to the text based on the ink parameters. The ink conversion feature can indicate a font (e.g., cursive or block lettering), a font size (e.g., based on height of the inked letter), a font style (e.g., underline, italics, bold, regular), a font effect (e.g., strikethrough, superscript, subscript, capital letters), and a color or ink effect (e.g., red, blue, rainbow, galaxy).

Figure 1:
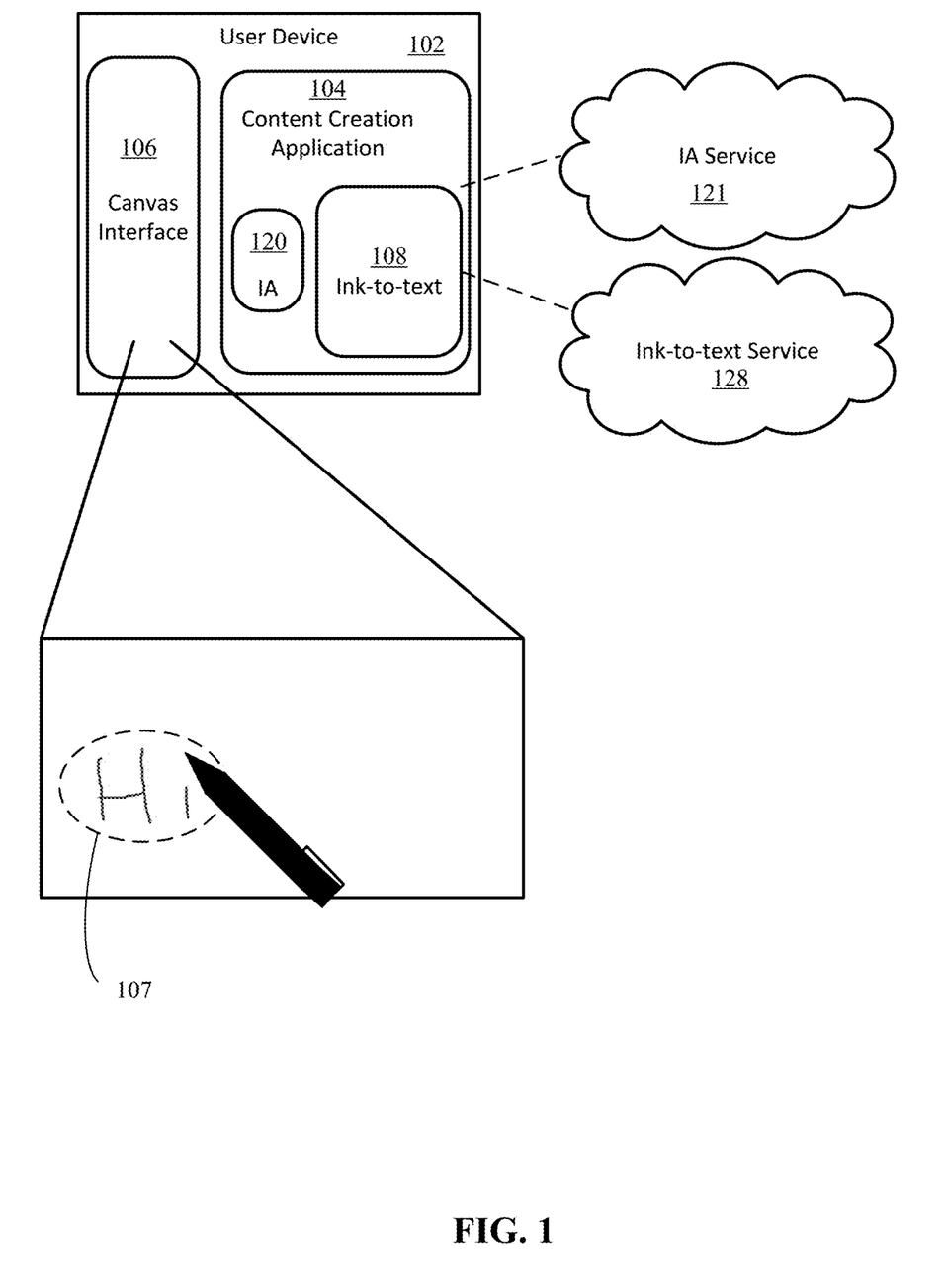
FIG. 1 illustrates an example operating environment in which various embodiments of the invention may be carried out.
Figure 2:
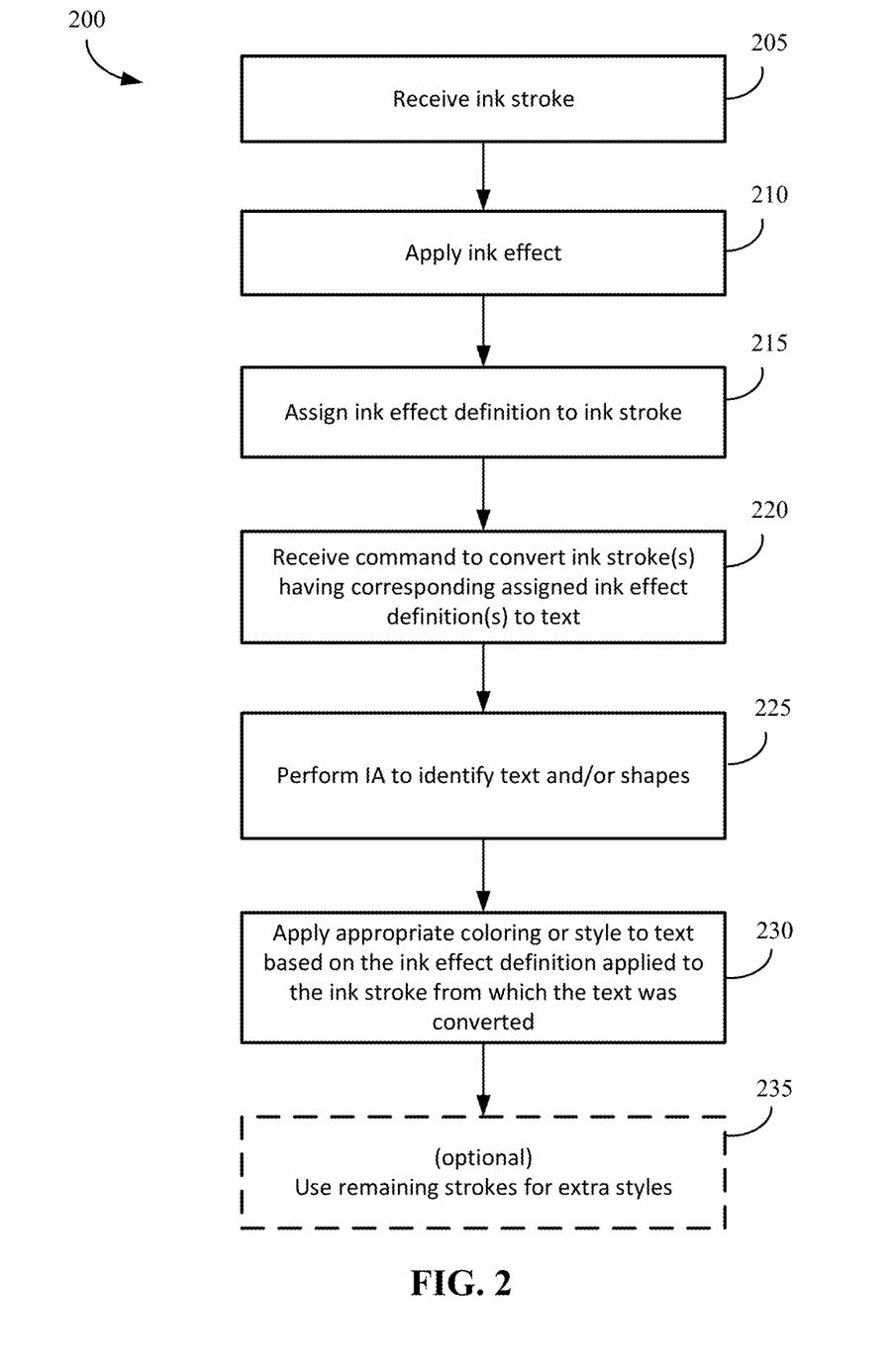
FIG. 2 illustrates an example process flow diagram.

FIG. 1 illustrates an example operating environment in which various embodiments of the invention may be carried out; and FIG. 2 illustrates an example process flow diagram.

Referring to FIG. 1, the example operating environment may include a user device 102 running a content creation application 104 with a content creation application canvas interface 106, and an ink-to-text component 108 providing an ink conversion feature.

Figure 4:
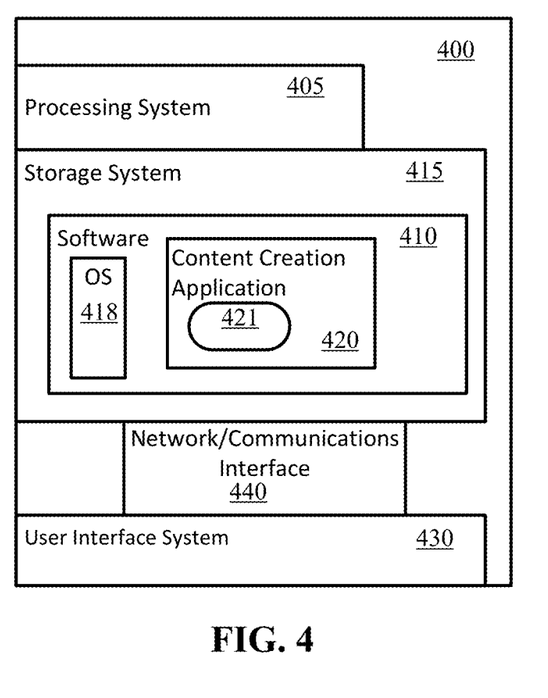
FIG. 4 illustrates components of a computing device that may be used in certain embodiments described herein.

User device 102 may be a computing device such as described with respect to system 400 of FIG. 4. The user device 102 may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, a whiteboard, or a smart television.

The content creation application 104 may be any content creation application that can support inking. During typical inking capture, a digitizer generally provides a set of coordinates on a grid that can be used to convert an analog motion into discrete coordinate values. A digitizer may be laid under or over a screen or surface that can capture the movement of a finger, pen, or stylus (e.g., the handwriting or brush strokes of a user). Depending on the features of the digitizer, information such as pressure, speed of motion between points, and direction of motion can be collected. The collected information provides a set of data defining an ink stroke. Ink stroke data refers to a set of properties and point data that a digitizer captures that represent the coordinates and properties of a "marking". It can be the set of data that is captured in a single pen down, up, or move sequence. The set of data can include "ink parameters" such as, but not limited to, position, a beginning of the stroke, an end of the stroke, the pressure of the stroke, the tilt (e.g., of a pen) for the stroke (can also be referred to as the azimuth), the direction of the stroke, the time and timing of the stroke between discrete coordinates along the path of the stroke, the color of the 'ink', and any ink effects or styles (including highlighting). It should be understood that some of the ink stroke data may be metadata on the ink stroke itself, and some of the ink stroke data may be metadata per ink point.

The canvas interface 106 can refer to the graphical user interface (GUI) through which content appears to be created, conceptually being a substrate for a work of authorship.

The ink-to-text component 108 can be a standalone application providing ink-to-text functionality with ink conversion feature, or an ink-to-text feature of the content creation application 104 to provide the ink-to-text functionality with ink conversion feature within the content creation application 104. Included with the ink-to-text component 108 (or at least accessible with the ink-to-text component 108) is a style mapper, which maps parameters of ink points and ink strokes to text styles and effects.

In some cases, the content creation application 104 includes an ink analyzer (IA) 120. In some cases, the content creation application 104 communicates with an external (to the application 104 or even external to the user device 102) IA. An ink analyzer is a feature that analyzes the ink strokes and identifies inked terms and other recognizable groupings of ink strokes. A grouping of ink strokes that are identified as forming a drawn unit (e.g., term or drawing) can be considered stored within a data structure of an ink container. The ink container can include metadata associated with the word or drawing as a whole, as well as the ink stroke parameters for each ink stroke in the ink container.

Components (computing systems, storage resources, and the like) in the operating environment may operate on or in communication with each other over a network (not shown). The network can be, but is not limited to, a radio network, cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as understood by those skilled in the art.

Communication to and from the components, such as the components running on the user device 102, may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other. Over the internet, APIs are commonly implemented as a set of Hypertext Transfer Protocol (HTTP) request messages and a specified format or structure for response messages according to a REST (Representational state transfer) or SOAP (Simple Object Access Protocol) architecture.

Referring to both FIG. 1 and FIG. 2, the content creation application 104 can receive (205), for example via the canvas interface 106 of the content creation application 104, ink strokes 107 from a user. The ink strokes 107 form inked content, for example, an inked word, symbol, or drawing handwritten to the canvas interface 106 by the user. The user may command the application to apply (210) an ink effect (or modify an ink effect) of the inked content. For example, a user may select rainbow ink before or after drawing the stroke. The ink effect(s) and styles, including highlighting, can be associated with the ink strokes by assigning (215) the ink effect definitions to the stroke (and storing with document).

That is, when inking, a user may indicate an inking effect to apply to the stroke or may apply options for the ink effect already applied to the stroke. This ink effect can be identified by an ink effect definition associated with the stroke as part of the document drawing parameters. The ink effect definitions define additional graphical effects that are applied to the geometries of the strokes shown in the graphical user interface (GUI). These effects may be shown in various layers, and have various behaviors that are set by the user. The ink effect definitions may include image files (e.g., bitmap, GIF (graphics interchange format), JPEG (joint photographic experts group), PNG (portable network graphic)) as well as a spectral line or color gradients (defining various colors to use in series with a stroke). In some cases, animated images, such as animated GIFs, may be included as the image files for ink effect definitions. In some cases, an ink effect can be generated using a spectral line that is applied from an anchor color of a spectral line to a geometry of a stroke. Depending on the length of the stroke, the length of a draw distance drawing parameter, whether the color series of the spectral line is variable-length-enabled for individual colors or each color is afforded the same relative length when applied, the orientation of application (e.g., horizontally, along the path of the stroke, across the stroke), and the length of the stroke, the spectral line will be applied differently to the geometry of the stroke. The spectral line defines the colors that are applied as a mesh (e.g., a triangular mesh) or as a raster map to the geometry of a stroke. The geometry with the applied mesh (or raster map) can be rendered in the GUI.

The ink-to-text component 108 can be triggered when receiving (220) a command to convert ink stroke(s) to text. When converting ink-to-text, the ink-to-text component 108, for example via the ink analyzer 120, can perform (225) ink analysis to identify text and/or shapes. The ink analysis (via ink analyzer 120) can determine groupings of ink strokes that form inked content and identify text and/or shapes for the inked content. The IA 120 can perform ink analysis on the received ink strokes to identify, for example, characters (e.g., letters, numbers, symbols, and punctuation), words, and shapes. The IA 120 can recognize the at least one recognized term and determine a text-based version (e.g., a typeset string of characters) of the inked term or inked drawing. For example, a user may ink the word "rainbow" on the UI 106 of the content creation application 104. The IA 120 can analyze the ink strokes and determine that a string of characters forming the word "rainbow" was inked. In some cases, the IA 120 may run as an automatic background process and its output accessed by the ink-to-text component 108 when the command to convert ink strokes is received.

In some cases, the IA 120 may be included in a service (e.g., IA service 121) separate from the content creation application 104. In this case, the content creation application 104 (and ink-to-text component 108) may communicate with a separate service (e.g., IA service 121) that includes the IA to perform the ink analysis (225) to identify the text or shapes.

In some cases, parts or all of ink-to-text component 108 may be carried out by an ink-to-text service 128. In those cases, the content creation application 104 can communicate ink strokes to the ink-to-text service 128 to obtain the appropriate coloring or style for each character or word.

An appropriate coloring or style can be applied (230) to the text based on the parameter of the ink strokes and ink points, including any ink effect definition. Prior to, during, or after the identification of the text and/or shapes via operation 225, the parameters of the ink strokes and ink points can be used to determine the corresponding style attributes for text. Based on the parameters of the ink strokes, including any ink effect definitions assigned to the ink stroke from which the text was converted, the appropriate coloring or style can be applied (230) to the text. For certain ink effects, such as rainbow ink, colors can be applied character-by-character. Structure such as paragraph, lines, and words can be applied based on location and recognizable groupings of ink strokes. Optionally, any strokes remaining that were not used to identify text and/or shapes may be used (235) for extra styles. For example, the ink strokes can include highlighter ink strokes and non-highlighter ink strokes. The ink analyzer can receive the non-highlighter ink strokes to identify the text. The highlighter strokes and any strokes of the one or more ink strokes that are not used by the ink analyzer can be analyzed and an extra style based on these strokes not used by the ink analyzer can be applied. The extra style may be highlighting, underline, or strike-through.

The ink-to-text component 108 can include or access a style mapper, and, using the parameters of the ink stroke and/or ink points, identify an appropriate style for the text. The mapping can be used to convert ink effect definitions for the stroke to ink effects and other styles in the text. For example, rainbow ink is an ink effect where a bitmap of the stroke is assigned a set of colors in a repetitive sequence according to the colors of the rainbow. There can be at least seven colors used in rainbow ink; for the mapping, 7, 16, 20, or more colors may be arranged in an ordered list to provide gradations of color. When converting text with the rainbow ink effect, each character can be independently colored. For example, the ordered list of color values can be used to apply a color to each character in a word corresponding to a group of strokes originally assigned the rainbow ink effect. The ordered list of color values may even be able to be accessed to continue writing in text with the rainbow ink.

Accordingly, a method of preserving styles and ink effects in ink-to-text can include receiving ink strokes, each ink stroke comprising ink parameters including pressure, ink color, and ink effect; receiving a command to convert one or more ink strokes to text; identifying text comprising characters and words from the one or more ink strokes; generating an appropriate coloring or style for each character or word based on the ink parameters associated with corresponding ink strokes, the appropriate coloring or style being generated based on a mapping between ink parameters and text parameters; and applying the appropriate coloring or style to the text.

Advantageously, the described ink conversion feature can preserve the size, color, and other formatting options, including ink effects.

According to an implementation, when a user handwrites something and then selects the ink to convert to text, the system analyzes the font colors, size, highlights, and other elements to create a text representation of the ink. In some cases, it can appear to be a 1:1 mapping (or close to) rather than simply converting all ink into, for example, 11 pt Calibri font.

For example, to determine an appropriate font size, the size of the original strokes, including an area covered by the one or more ink strokes corresponding to the word are analyzed to identify a corresponding font size. The font size can be applied independently to each character in a word, to the whole word, to a whole sentence or to a whole paragraph.

Bold font style can be applied to text based on pressure values. For example, a threshold or range can be used to determine whether pressure values indicate that bold lettering is desired. In some cases, standard editing marks can be used to indicate whether bold or even italics are desired. For example, italics may be indicated by some editors as a squiggly mark under a character or word. During the ink analysis for identifying characters and words, the squiggly mark can be recognized, and the ink-to-text component can use that identification to assign an italic font. Similarly, underlining can be recognized and applied to the text.

More than one font may be applied. For example, a cursive font and a standard font may be used when converting ink-to-text. To determine whether a cursive font is to be applied, the ink strokes associated with a word can be analyzed. If a single stroke is associated with more than one letter of a word, then a cursive font may be applied to the word.

Color can be applied by determining, from the ink parameters of the one or more ink strokes associated with a word, the ink color of the ink stroke, identifying a corresponding text color, and assigning the corresponding text color to the word. In that manner, red ink can be red text, blue ink can be blue text, and so on.

Highlighting can also be accomplished. For example, converting ink to text can be based on analyzing ink stroke for sizing and collision with highlighting. A highlighting inking stroke can be converted to highlighted background for the text. In some cases, highlighter ink strokes can be recognized during the analysis of the parameters associated with the ink strokes, and based on whether a highlighter stroke collides, or otherwise intersects with, strokes corresponding to some text, the system can add a background color to the text. The highlighting can be done per word. The word does not need to be completely covered to be highlighted: as long as the highlighter stroke intersects the text, the text can be highlighted. This highlight of the text may be accomplished by setting the background of the generated text to the color of the highlighter stroke, and the highlighter stroke is removed.

In some cases, underline can also be identified using position analysis. For example, if there were strokes that were below or on top of some recognized text, and if these strokes were straight and could be recognized as being lines, an extra style can be applied. Text with a straight line below the text could have underline applied. In some cases, a straight line on top of the text could signify an editor command, for example to show strikethrough.

For the ink effect, the effects are mapped to an array of colors, for example in an ordered list, which can create the gradient effect for the ink effect.

Unlike in Optical Character Recognition (OCR), which looks at a picture and extracts information, the described ink-to-text feature looks at the ink strokes. In particular, ink strokes contain parameters regarding how the words were written, including pressure and direction, that are able to be used to generate an appropriate coloring or style for the text based on a mapping between ink parameters and text parameters. Indeed, the ink container (the structure of the ink stroke data) for an ink stroke can be parsed to obtain the parameters of the ink stroke including the ink effect. The ink effect can be used to identify the corresponding text effect. The text effect may be an existing style or effect available in the content creation application (e.g., a glow text effect, reflection text effect, or a shadow text effect) or may be a special effect specifically created to correspond to an ink effect. For example, rainbow ink and galaxy ink to not currently have analogs in text color options. However, the described ordered list of colors described above can be used to generate the appropriate color selection.

Figure 3A:
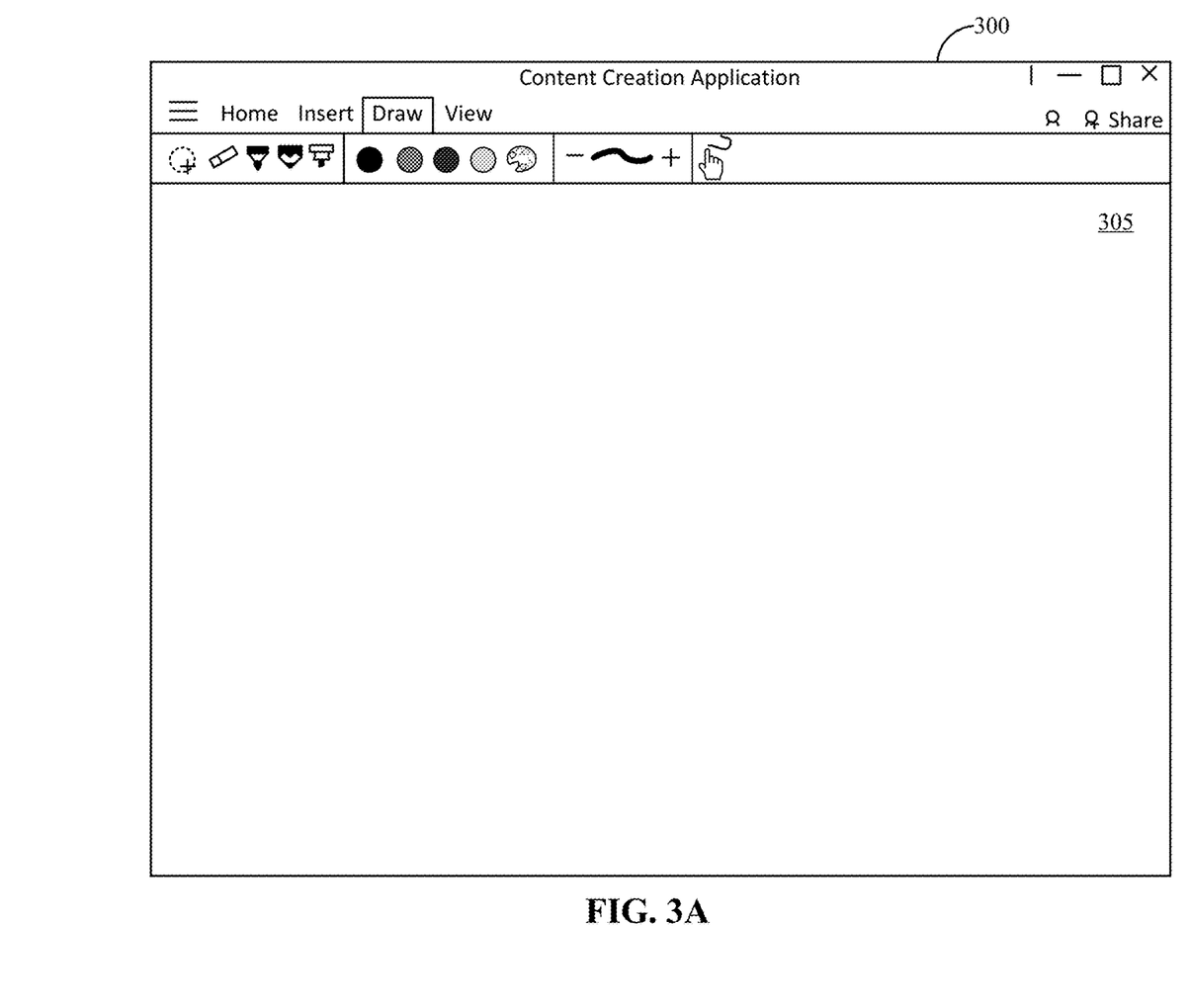
FIGS. 3A-3C illustrate example scenarios of preserving ink effects in ink-to-text.
Figure 3B:
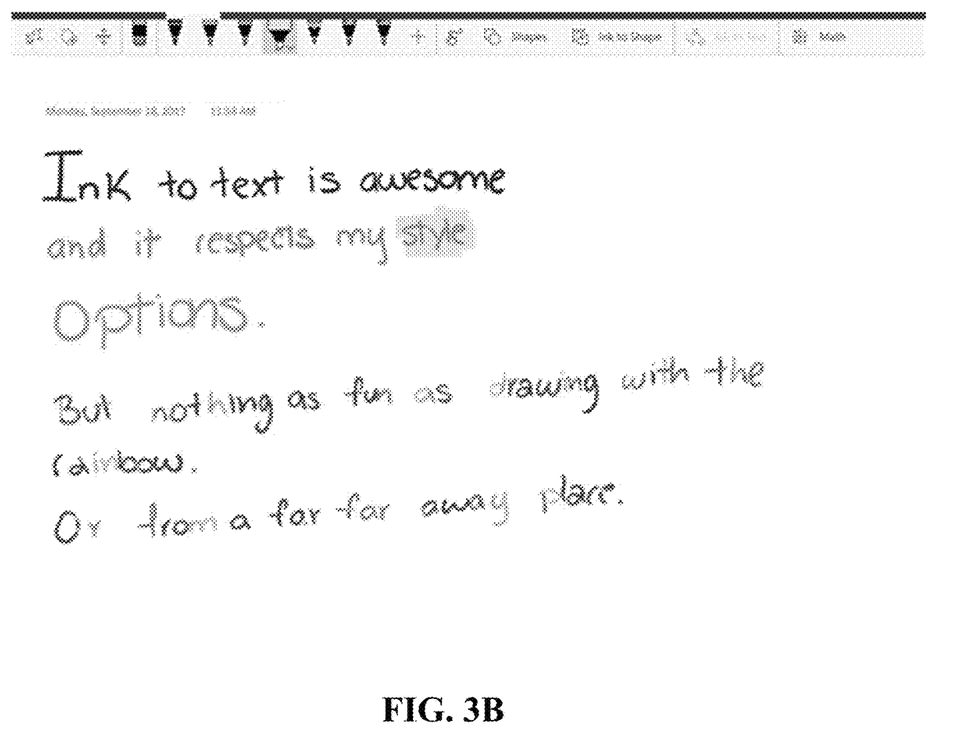
Figure 3C:
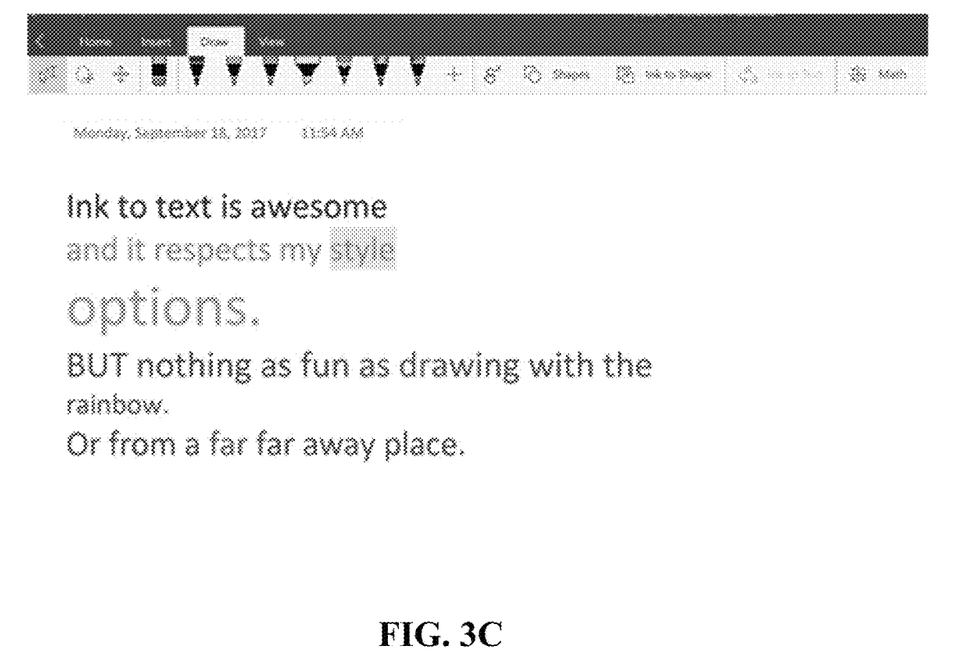

FIGS. 3A-3C illustrate example scenarios of preserving ink effects in ink-to-text. FIG. 3A illustrates a whiteboard GUI 300. A user may have inked some content with various colors and effects such as shown in FIG. 3B. To use the in-to-text feature, a user may select a command, such as by clicking an "Ink to Text button" on a menu in the GUI. That command will cause the ink to be converted to text, for example via the ink analyzer 120 and ink-to-text component 108. FIG. 3C shows the converted ink that maintains the colors and the rainbow and galaxy effects. As can be seen, the size of the text corresponds to the size of the inked word. In addition, highlighting and coloring of the text is recognized. In addition, the ink effects of rainbow ink and galaxy ink are reflected in the coloring of each character in the words corresponding to the inked words having those effects.

FIG. 4 illustrates components of a computing device that may be used in certain embodiments described herein.

Referring to FIG. 4, system 400 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, whiteboard, or a smart television. Accordingly, more or fewer elements described with respect to system 400 may be incorporated to implement a particular computing device.

System 400 includes a processing system 405 of one or more hardware processors to transform or manipulate data according to the instructions of software 410 stored on a storage system 415. Examples of processors of the processing system 405 include general purpose central processing units, application specific processors, and logic devices, as well as any other type of processing device, combinations, or variations thereof. The processing system 405 may be, or is included in, a system-on-chip (SoC) along with one or more other components such as network connectivity components, sensors, video display components.

The software 410 can include an operating system 418 and application programs such as a content creation application 420 that has ink-to-text functionality 421 as described herein. Device operating systems generally control and coordinate the functions of the various components in the computing device, providing an easier way for applications to connect with lower level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It should be noted that the operating system 418 may be implemented both natively on the computing device and on software virtualization layers running atop the native device operating system (OS). Virtualized OS layers, while not depicted in FIG. 4, can be thought of as additional, nested groupings within the operating system space, each containing an OS, application programs, and APIs.

Storage system 415 may comprise any computer readable storage media readable by the processing system 405 and capable of storing software 410 including the content creation application 420 and ink to text component 421. Instructions for a content creation application 420 with ink-to-text component 421 can be stored on the storage system 415 such that that, when executed by the processing system 405, the instructions direct the processing system to at least: receive one or more ink strokes via the user interface system, each ink stroke comprising ink parameters; apply an ink effect to at least one of the one or more ink strokes; assign an ink effect definition to the at least one ink stroke such that ink parameters of the at least one ink stroke include the ink effect; receive, via the user interface system, a command to convert the one or more ink strokes to text; perform ink analysis to identify text comprising characters and words from the one or more ink strokes; generate an appropriate coloring or style for each character or word based on the ink parameters associated with corresponding ink strokes, the appropriate coloring or style being generated based on a mapping between ink parameters and text parameters; and apply the appropriate coloring or style to the text.

Storage system 415 may include volatile and nonvolatile memory, removable and non-removable media implemented in any method or technology for storage of information, such as computer readable instructions, data structures, program modules, or other data. Examples of storage media of storage system 415 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal or carrier wave.

Storage system 415 may be implemented as a single storage device but may also be implemented across multiple storage devices or sub-systems co-located or distributed relative to each other. Storage system 415 may include additional elements, such as a controller, capable of communicating with processing system 405.

Software 410 may be implemented in program instructions and among other functions may, when executed by system 400 in general or processing system 405 in particular, direct system 400 or the one or more processors of processing system 405 to operate as described herein.

The system can further include user interface system 430, which may include input/output (I/O) devices and components that enable communication between a user and the system 400. User interface system 430 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 430 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

For inclusion of the described inking functionality for the content creation application 421, the user interface system 430 includes a digitizing pen or a touch-based user input interface or other interface that can support inking. A touch-based user input interface can include a touchscreen and/or surface with sensing components for a digitizer. In some cases, a digitizing pen may be used in place of or as part of a touch-based user input interface.

Visual output may be depicted on the display (not shown) in myriad ways, presenting graphical user interface elements, text, images, video, notifications, virtual buttons, virtual keyboards, or any other type of information capable of being depicted in visual form.

The user interface system 430 may also include user interface software and associated software (e.g., for graphics chips and input devices) executed by the OS 418 in support of the various user input and output devices. The associated software assists the OS 418 in communicating user interface hardware events to application programs using defined mechanisms. The user interface system 430 including user interface software may support a graphical user interface, a natural user interface, or any other type of user interface. For example, the canvas interfaces for the content creation/curation application 420 described herein may be presented through user interface system 430.

Network interface 440 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 418, which informs applications of communications events when necessary.

Certain techniques set forth herein with respect to the content creation application and/or ink-to-text feature may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that, as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above unless otherwise defined. Rather, the specific features and acts described above are disclosed as examples of implementing the claims and other equivalent features and acts are intended to be within the scope of the claims.

What is claimed is:

1. A method of preserving styles and ink effects in ink-to-text, comprising:
   receiving ink strokes, each ink stroke comprising ink parameters including pressure values, ink color, and ink effect;
   receiving a command to convert one or more ink strokes to text;
   identifying text comprising characters and words from the one or more ink strokes;
   generating an appropriate coloring or style for each character or word based on the ink parameters associated with corresponding ink strokes by:
      obtaining the ink parameters associated with the corresponding ink strokes; and
      mapping the ink parameters associated with the corresponding ink strokes to text parameters by:
         determining whether the pressure values of a grouping of ink strokes corresponding to the word in the text fall within a range indicating bold lettering; and
         if the pressure values fall within the range indicating bold lettering, assigning a bold font style to the word,
   wherein the appropriate coloring or style is generated based on the mapping between the ink parameters and the text parameters; and
   applying the appropriate coloring or style to the text.

2. The method of claim 1, wherein the ink strokes comprise highlighter ink strokes and non-highlighter ink strokes, the method further comprising:

providing the non-highlighter ink strokes to an ink analyzer for the identifying of the text comprising characters and words from the one or more ink strokes; and applying an extra style using the highlighter ink strokes and any ink strokes of the one or more ink strokes that are not used by the ink analyzer.

3. The method of claim 1, wherein generating the appropriate coloring or style for each character or word comprises:

for each word, identifying whether a single ink stroke is associated with more than one letter; and if there is a single ink stroke that is associated with more than one letter, assigning a cursive font to the word.

4. The method of claim 1, wherein generating the appropriate coloring or style for each character or word comprises:

determining a size of a word from an area covered by the one or more ink strokes corresponding to the word;

identifying a corresponding font size for each word independently or as a whole paragraph or sentence; and assigning the corresponding font size to each word independently or to the whole paragraph or sentence.

5. The method of claim 1, wherein generating the appropriate coloring or style for each character or word comprises:

determining the ink color from the ink parameters of the one or more ink strokes associated with a word;

identifying a corresponding text color; and assigning the corresponding text color to the word.

6. The method of claim 1, wherein generating the appropriate coloring or style for each character or word comprises:

determining from the ink parameters, the ink effect;

selecting a corresponding text effect for the ink effect; and assigning the corresponding text effect to the text.

7. The method of claim 6, wherein the ink effect is rainbow ink, wherein assigning the corresponding text effect to the text comprises:

assigning a first character of a word with a first color of an ordered list of colors associated with the rainbow ink; and assigning each consecutive character a next color in the ordered list.

8. The method of claim 6, wherein the ink effect is galaxy ink, wherein assigning the corresponding text effect to the text comprises:

assigning a first character of a word with a first color of an ordered list of colors associated with the galaxy ink; and assigning each consecutive character a next color in the ordered list.

9. The method of claim 1, wherein the identifying of the text comprising the characters and the words from the one or more ink strokes comprises communicating the one or more ink strokes to an ink analyzer service that performs ink analysis to identify text and shapes from the one or more ink strokes; and receiving the text comprising the characters and the words.

10. A system comprising:

a processing system;

a user interface system;

a storage system; and instructions for a content creation application with ink-to-text component stored on the storage system that, when executed by the processing system, directs the processing system to at least:

receive one or more ink strokes via the user interface system, each ink stroke comprising ink parameters including pressure values, ink color, and ink effect;

apply an ink effect to at least one of the one or more ink strokes;

assign an ink effect definition to the at least one of the one or more ink strokes such that ink parameters of the at least one of the one or more ink strokes include the ink effect;

receive, via the user interface system, a command to convert the one or more ink strokes to text;

perform ink analysis to identify text comprising characters and words from the one or more ink strokes;

generate an appropriate coloring or style for each character or word based on the ink parameters associated with corresponding ink strokes by:

obtaining the ink parameters associated with the corresponding ink strokes; and mapping the ink parameters associated with the corresponding ink strokes to text parameters by:

determining whether the pressure values of a grouping of ink strokes corresponding to the word in the text fall within a range indicating bold lettering; and if the pressure values fall within the range indicating bold lettering, assigning a bold font style to the word, wherein the appropriate coloring or style is generated based on the mapping between the ink parameters and the text parameters; and apply the appropriate coloring or style to the text.

11. The system of claim 10, wherein the instructions to generate the appropriate coloring or style for each character or word, direct the processing system to:

determine from the ink parameters, the ink effect;

select a corresponding text effect for the ink effect; and assign the corresponding text effect to the text.

12. The system of claim 11, wherein the corresponding text effect is a glow text effect or a shadow text effect.

13. The system of claim 11, wherein the ink effect is rainbow ink, wherein the instructions to assign the corresponding text effect to the text direct the processing system to:

assign a first character of a word with a first color of an ordered list of colors associated with the rainbow ink; and assign each consecutive character a next color in the ordered list.

14. The system of claim 10, wherein the instructions to generate the appropriate coloring or style for each character or word, direct the processing system to:

for each word, identify whether a single ink stroke is associated with more than one letter; and if there is a single ink stroke that is associated with more than one letter, assign a cursive font to the word.

15. The system of claim 10, wherein the instructions to generate the appropriate coloring or style for each character or word, direct the processing system to:

determine a size of each character in a word from an area covered by the one or more ink strokes corresponding to the word;

identify a corresponding font size for each character independently or as a whole word; and assign the corresponding font size to each character independently or to the whole word.

16. One or more computer-readable storage media having instructions stored thereon that when executed by a processing system, direct the processing system to:

receive ink strokes, each ink stroke comprising ink parameters including pressure values, ink color, and ink effect;

receive a command to convert one or more ink strokes to text;
identify text comprising characters and words from the one or more ink strokes;
generate an appropriate coloring or style for each character or word based on the ink parameters associated with corresponding ink strokes by:
　obtaining the ink parameters associated with the corresponding ink strokes; and
　mapping the ink parameters associated with the corresponding ink strokes to text parameters by:
　　for each word:
　　　determining whether the pressure values of a grouping of ink strokes corresponding to the word in the text fall within a range indicating bold lettering;
　　　if the pressure values fall within the range indicating bold lettering, assigning a bold font style to the word;
　　　identifying whether a single stroke is associated with more than one letter of the word;
　　　if there is a single stroke that is associated with more than one letter of the word, assigning a cursive font to the word;
　　　determining a size of each character in the word from an area covered by the one or more ink strokes corresponding to the word;
　　　identifying a corresponding font size for each character independently or as a whole word;
　　　assigning the corresponding font size to each character independently or to the whole word;
　　　determining, from the ink parameters of the one or more ink strokes associated with a word, the ink color or the ink effect;
　　　identifying, from the ink color, a corresponding text color or identify, from the ink effect, a corresponding text effect; and
　　　assigning the corresponding text color to the word or assign the corresponding text effect to the text,
　wherein the appropriate coloring or style is generated based on the mapping between the ink parameters and the text parameters; and
apply the appropriate coloring or style to the text.

17. The media of claim 16, wherein the ink effect is rainbow ink, wherein the instructions to assign the corresponding text effect to the text direct the processing system to at least:
　assign a first character of a word with a first color of an ordered list of colors associated with the rainbow ink; and assign each consecutive character a next color in the ordered list.

* * * * *